Nov. 28, 1961 B. R. HOPKINS 3,010,234
SUPPORTED VERTICAL DISPLAY PANELS
Filed Sept. 29, 1960 3 Sheets-Sheet 1
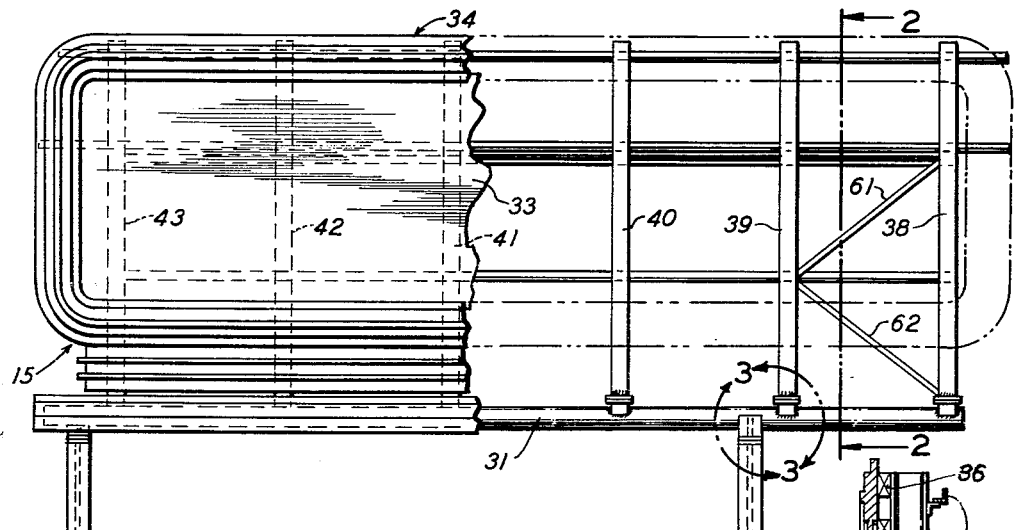
FIG. 1.
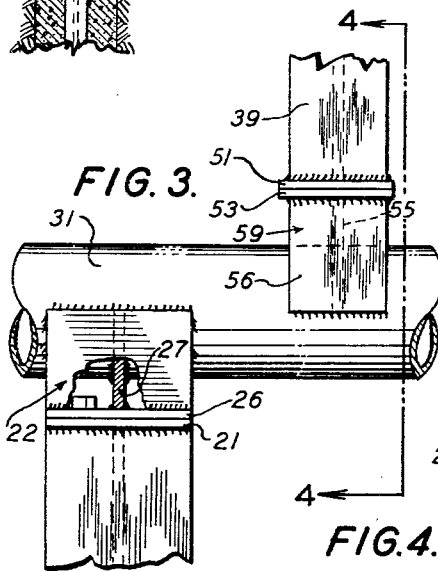
FIG. 3.
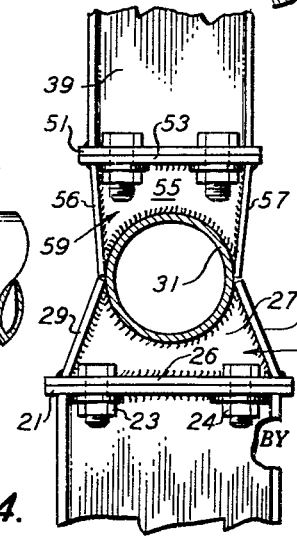
FIG. 2.
FIG. 4.
INVENTOR.
BEN R. HOPKINS
W. J. Gribble
ATTORNEY

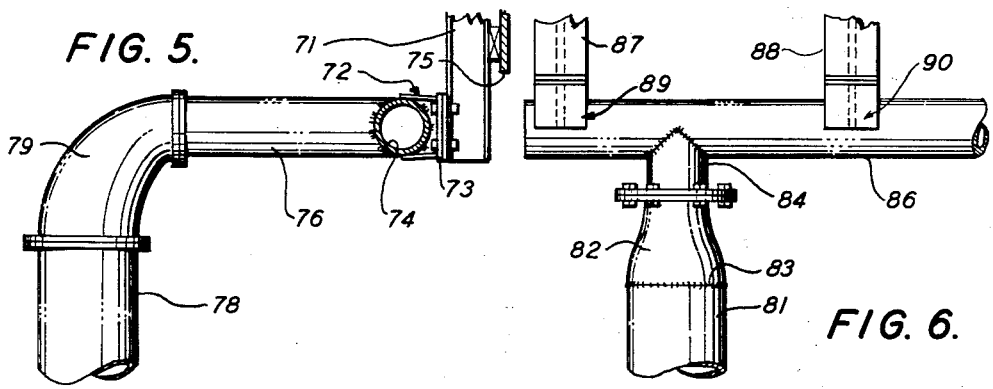
FIG. 5.
FIG. 6.
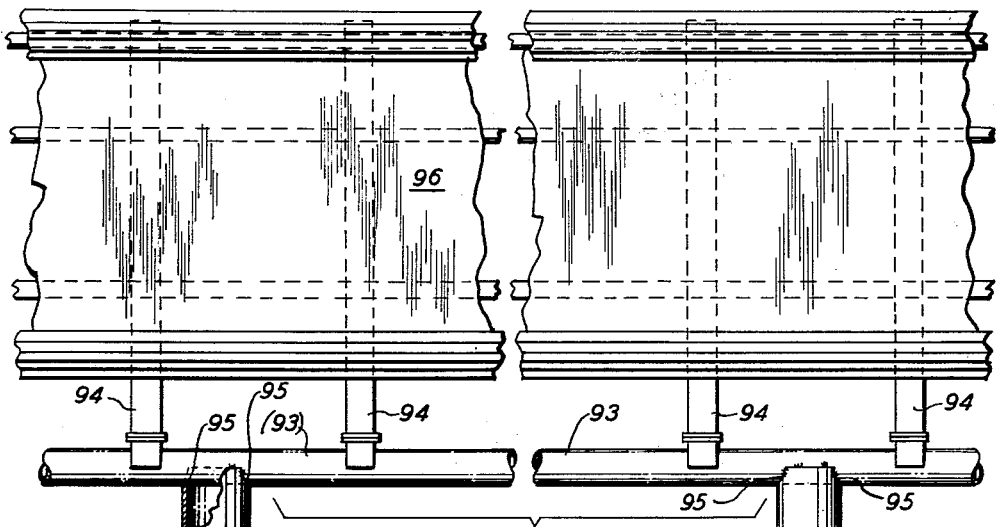
FIG. 7.
INVENTOR.
BEN R. HOPKINS
BY W. J. Gribble
ATTORNEY

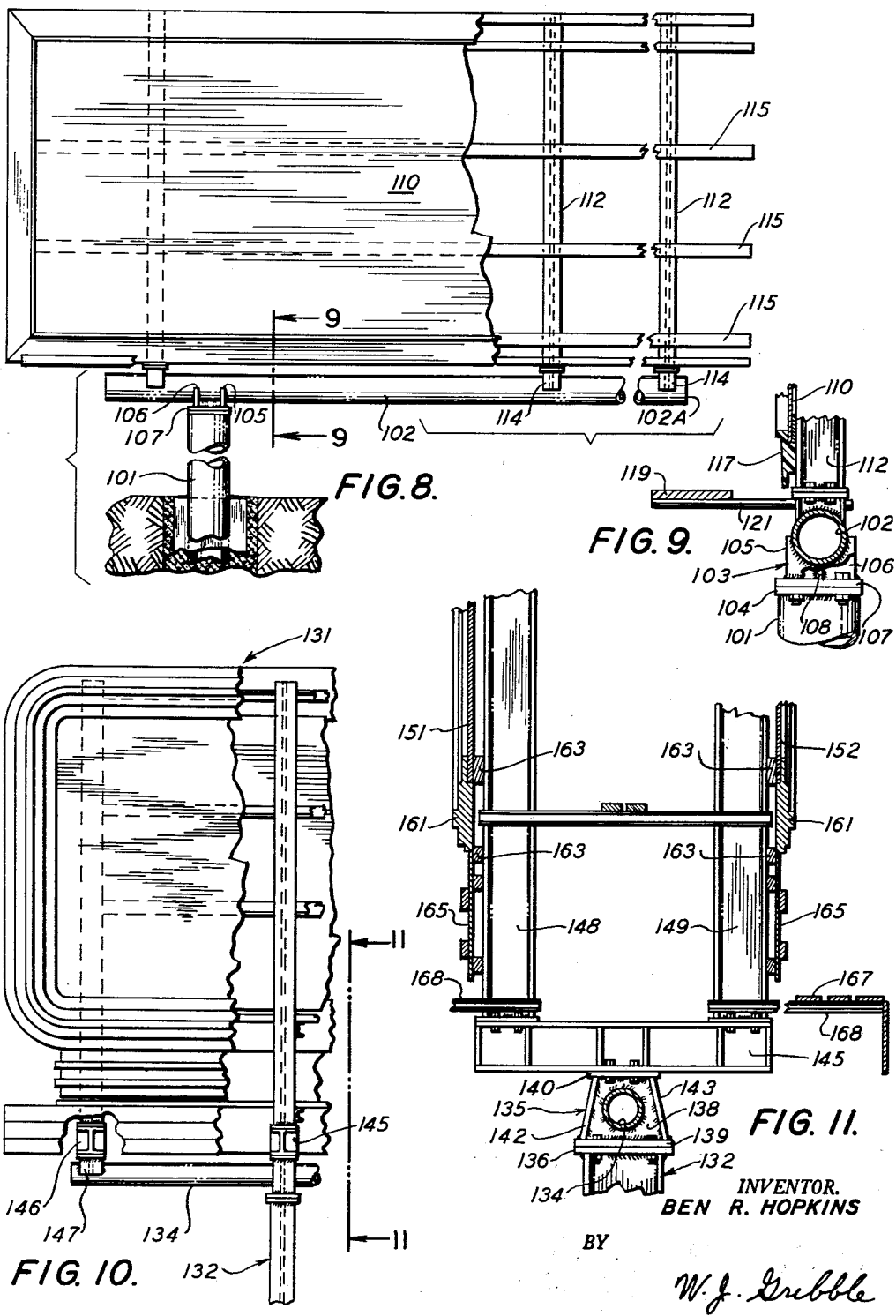

United States Patent Office
3,010,234
Patented Nov. 28, 1961

3,010,234
SUPPORTED VERTICAL DISPLAY PANELS
Ben R. Hopkins, La Crescenta, Calif., assignor to Pacific Outdoor Advertising Company, Los Angeles, Calif., a corporation of California
Filed Sept. 29, 1960, Ser. No. 59,396
2 Claims. (Cl. 40—125)

The invention relates to display frames or panels supported in a substantially vertical plane, such as outdoor advertising sign boards and the like.

Placement of conventional vertical frames that hold the display areas of outside advertising sign boards is handicapped by the necessity for a great number of vertical supports to carry the frame. Conventionally, the vertical framing members of the sign board are extensions of the support posts. In rare instances the members extend between truss members at the top of the sign and on the top of the base supports. Such structure is costly and limited as to sites which can be utilized for display advertising. It is also unpleasant in appearance. I have invented apparatus for supporting vertical display frames and panels which is artistically meritorious, suited to construction sites heretofore precluded to outdoor advertising sign boards, and results in great economy of both material and labor.

The invention contemplates apparatus which comprises a support which may be either cylindrical or of conventional structural steel shapes. A horizontal beam or tube of circular cross section is fixed to the top of the support. Vertical members extend from the tube and hold a display panel. The members are fixed to the tube so that lateral motion of the vertical member normal to the display panel surface (such as may be caused by wind loading) is transmitted to the support through the tube, because of the torsional forces imposed thereon.

The apparatus of the invention may comprise a plurality of supports to which the torque tube is fixed. Preferably the apparatus of the invention includes means for fixing the torque tube to the support that separates the tube from the top of the support. Similarly, the preferred embodiment of the invention includes means for fixing the vertical members to the torque tube that spaces the vertical members from the surface of the torque tube. The vertical members may be braced to receive the display panel by framepieces which cross the vertical members horizontally or diagonally.

The apparatus of the invention is very flexible, lending itself to asymmetrical placement of the display board with respect to the torque tube supports. Additionally either single or double faced display boards may be used. Conventional walkways and lights may be suspended from vertical frame members in conventional fashion.

The economies of eliminating a multiplicity of vertical posts or top and bottom truss members are self evident. The added artistic appeal of sign boards in accordance with the invention stems from the simplicity possible with the inventive apparatus. These and other advantages of the invention are apparent in the following detailed description and drawing in which;

FIG. 1 is a front elevation, partly broken away, of an embodiment of the invention employing two supports;

FIG. 2 is a fragmentary sectional elevation taken along line 2—2 of FIG. 1;

FIG. 3 is an enlarged fragmentary front elevation taken in the area 3—3 of FIG. 1;

FIG. 4 is an enlarged fragmentary sectional elevation taken along line 4—4 of FIG. 3;

FIG. 5 is a fragmentary transverse sectional elevation of an alternate embodiment of the invention;

FIG. 6 is fragmentary front elevation of a further alternate embodiment of the invention;

FIG. 7 is a fragmentary front elevation partly broken away, of a still further embodiment of the invention;

FIG. 8 is a fragmentary front elevation, partly broken away, of sign board in accordance with the invention and supported by a single support;

FIG. 9 is a fragmentary sectional elevation taken along line 9—9 of FIG. 8;

FIG. 10 is fragmentary front elevation, partly broken away, of an embodiment of the invention in which display panels face two ways; and FIG. 11 is a fragmentary sectional elevation taken along line 11—11 of FIG. 10.

In the embodiment of the invention shown in FIGS. 1 through 4, an outdoor advertising display board indicated generally by the character 15 has a pair of spaced supports 16, 17 which may be conventional I-beams set in concrete pours 18, 19, at the sign board site. Each support has a bed plate 21 fixed at its top. A mounting assembly 22 is fixed to each bed plate as by bolt, washer and nut assemblies 23, 24 of FIG. 4.

Each mounting assembly comprises a sill 26, a web 27 and a pair of opposite lateral braces 28, 29. A horizontal tubular beam or torque tube 31 extends between, and is fixed to, the mounting assembly on each support 16, 17. Preferably the torque tube is welded to the respective webs 27 of the two assemblies. The tube acts both as a beam and as a torsion member.

The torque tube may extend outwardly beyond each of the mounting assemblies in accordance with the desired sign configuration. The diameter and wall thickness of the torque tube is determined largely by the unsupported span of the torque tube and by the wind loading to which a display panel 33 which the tube supports is subjected. In the embodiment illustrated by FIGS. 1 through 4 display panel 33 has a decorative border 34 about its edge and is supported from a plurality of lateral stringers 36 in turn fixed to a plurality of vertical frame members 38, 39, 40, 41, 42, 43. The signboard thus formed is equipped with conventional catwalks 45 and has conventional letter racks 47 for holding cutout letters above the top of the board. As best seen in FIGS. 3 and 4, each vertical member such as the frame member 39 is fixed as by welding to a second sill 51. Each sill is bolted to a second bed plate 53 attached to the torque tube by a second web 55 and second lateral braces 56, 57 on opposite sides of the torque tube. The second bed plate, web and lateral braces comprise a support assembly 59 for each vertical member.

As can be seen from FIG. 4, the respective bed plates and sills are spaced from the periphery of the torque tube. Such spacing has the advantage of giving easy access for welding the tube to the support and mounting assembly. By utilizing such assembly a large part of the sign fabrication work can be done in the shop, thus lessening the amount of work done in the field at the site of sign erection, an arrangement having obvious economic advantages.

The embodiment of the invention shown in FIGS. 1 through 4 employs vertical frame members which may be lengths of I-beams. Lateral stringers 36, which may be 2 x 4's or like timbers, tie the members horizontally. Diagonal bracing such as the braces 61, 62, of FIG. 1 may be used depending on the stresses to which the board is exposed. The diagonal braces may be placed only at the extreme ends or may extend between each pair of adjacent vertical members. While the supports 16 and 17 have been represented as I-beam, they may be other structural shapes such as channel or thick-walled tubing.

The embodiments of the invention shown in FIGS. 5 through 7 display the versatility of the invention. For instance, FIG. 5 shows fragmentarily a sign board which may have a plurality of vertical frame members such as the member 71 each supported by a support assembly 72 similar to those described with respect to FIGS. 3 and 4 but oriented so that a bed plate 73 of the assembly lies in a vertical plane opposite a cantilever 76. The support assemblies are fixed to a horizontal torque tube 74 extending beneath a display panel 75 supported by the vertical members.

The torque tube is of a diameter and wall thickness necessary to withstand the stresses transmitted to it through the support assemblies from the vertical members. The torque tube in the embodiment of FIG. 5 is fixed to cantilever 76 extending from a vertical support 78. Such apparatus might be called for where the optimum position of the sign board could not coincide with the vertical axial plane of supports 78. An offset might be necessary because of other structures near the site of supports or by the particular visual field of the display panel.

The connection between cantilever 76 and support 78 may be a conventional reducing elbow 79 having flange connections. Preferably the attachment is made by bolts and nuts as described with respect to the embodiment of FIGS. 1 through 4.

In FIG. 6 a cylindrical support 81 is fixed to a reducing bell 82 which may be of a conventional flanged type. The bell is preferably fixed to the top of support 81 by continuous welding 83. A stub support 84 is bolted to the flanged bell. A torque tube 86 is in turn fixed as by welding to the stub support. Torque tube 86 may extend horizontally between spaced supports like support 81 or may extend in cantilever fashion outwardly from the support. Vertical frame members 87, 88 extend upwardly from support assemblies 89, 90 respectively. The assemblies are fixed to the torque tube in the manner described in conjunction with the embodiment of FIGS. 3 and 4. Apparatus of the type depicted in FIG. 6 may utilize a 16 inch diameter support and a reducing bell reducing from the 16 inch diameter to a 10 inch diameter. The flange on the bell is approximately 14 inches in diameter and both stub support 84 and torque tube 86 may be of 10 inch diameter tubing.

FIG. 7 illustrates an embodiment of the invention wherein a pair spaced supports 91, 92 (shown as cylindrical, but which might be of any structural shape) hold a cylindrical torque tube 93 from which a plurality of vertical members 94 extend upwardly to support a display panel 96. Torque tube 93 seats in recesses 95 of each support 91. The torque tube is fixed as by welding in the recesses so that stresses transferred from the vertical members are transmitted by the torque tube to the supports. The stresses are generated by wind load imposed upon the conventional display panel 96 of the sign.

The diameter of the torque tube and its wall thickness is determined by the wind loadings and other stresses which the torque tube must transmit to the supports. The wind loading usually imposes a deflection force acting normal to the surface of the display panel. Such loadings tend to cause arcuate motion of the vertical frame members (such as the member 39 of FIG. 2) generally about the central point of cylindrical torque tube 31. The following data demonstrates the considerable wind load which a sign board in accordance with the invention can accommodate:

A wind loading of 20 or 30 pounds per square foot: a 12 inch tube with a wall thickness of ¼ inch or 5/16 of an inch depending upon wind loading supports a 65 foot long sign panel having a total of 1950 square feet of wind resistance.

A ten inch diameter torque tube supports a 50 foot long display panel having a total area of 1020 square feet.

A ten inch torque tube with a ¼ inch wall thickness supports a 40 foot long display panel having 820 square feet of exposure to wind pressure.

An eight inch torque tube is successfully used with a display panel 24 feet six inches long having a total of 300 square feet. These latter two boards were subjected to and stressed for a wind loading of 20 pounds per square foot.

The embodiments illustrated by FIGS. 8 and 9 are special boards adapted to particular locations. For instance, the display panel 110 of FIG. 8 is supported from the ground by a single cylindrical support 101 to which a horizontal torque tube 102 is fixed by a mounting assembly 103 resting upon a bed plate 104 atop the support. The mounting assembly 103, as best shown in FIG. 9 comprises a pair of transverse braces 105, 106 rising from a sill 107 bolted to the bed plate. A lateral web 108 spaces the torque tube from the sill and is fixed to both the sill and the tube. The spacing between the sill and the tube makes for easier welding and provides units which can be assembled easily at the construction site.

As shown in FIG. 8, torque tube 102 extends outwardly to the right to unsupported end 102A. The unsupported extent of the torque tube affects the wall thickness and the diameter of the tube as well as does the wind load to which display panel 110 is subjected. A plurality of vertical frame members 112, which may be conventional I-beams extend upwardly from support assemblies 114 fixed in the fashion described with respect to previous embodiments to the upper surface of the torque tube. Cross braces or stringers 115 extend between vertical members and support display panel 110. The display panel is surrounded by trim 117 which may be of molded fiber glass. A conventional catwalk 119 extends across the front of the board, supported from a plurality of beams such as beam 121 fixed to the support assemblies 114.

The embodiment shown in the FIGS. 8 and 9 is particularly adapted to sign board sites having room for only a single support. Heretofore such sign boards were not economically feasible because of the presumed necessity for expensive horizontal truss member. The inventive concept illustrated by the board of FIG. 8 makes possible economical installations at sites which may have been desirable from the viewpoint of display because of heavy traffic or other visual aspects, but previously precluded because of construction difficulties.

FIGS. 10 and 11 illustrate a double faced sign board 131 supported from one or more supports 132. A horizontal torque tube 134 is in turn held in fixed fashion on support 132. A mounting assembly 135 is fixed to a first bed plate 136 on support 132. The mounting assembly illustrated in FIGS. 10 and 11 is unique in that a single web 138 welded to the torque tube about its periphery spaces a sill 139 and a second bed plate 140 from the torque tube. Lateral braces 142 and 143 of the mounting assembly are fixed both to sill 139 and bed plate 140. The entire mounting assembly may be bolted to first bed plate 136.

A specially reinforced I-beam 145 forms a sill and is fixed as by bolts to the bed plate of the mounting assembly. Pairs of vertical frame members 148, 149 are fixed to I-beam 145 and extend vertically therefrom. The vertical members are spaced apart and fixed near the ends of the I-beam so that the vertical plane of each of display panels 151, 152 supported in conventional fashion from vertical members 148, 149 lies outside of the axis of support 132. Thus a vertical frame is formed comprising I-beam 145 and vertical members 148, 149 and supported by the torque tube. A plurality of I-beams 146 and paired vertical members may be fixed to the torque tube at intervals that do not coincide with the supports 132. I-beams 146 are held by mounting support assemblies 147 substantially identical to those described with respect to FIGS. 3 and 4.

In conventional fashion the display panels 151, 152 are trimmed by outer borders 161 and supported from vertical members 148, 149 respectively by a plurality of horizontal lateral braces 163. A fascia trim 165 may extend across the area beneath each of the display panels to obscure the vertical members. Conventional catwalks 167 are supported by beams 168 cantilevered outwardly from selected ones of the vertical members 148, 149.

The illustrative drawing has presented several embodiments of the invention. These embodiments do not define the full scope of the invention but merely illustrate varying situations to which the apparatus of the invention is adapted. As specifically pointed out the invention may be embodied in apparatus in which display panels are supported by single support column, or may utilize a plurality of supports. The torque tube of the apparatus may be fixed directly to the basic supports or may be spaced therefrom by mounting assemblies. Such mounting assemblies may extend horizontally from the supports so that the torque tube is displaced from the vertical axis thereof. Conventional flanged fittings may be used to fix the torque tube with respect to its supports or especially designed assemblies may be fabricated for that purpose. The apparatus of the invention lends itself to shop fabrication and simple field assembly. However the invention does not preclude major components being assembled and fabricated in the field.

While conventional structural shapes have been used to illustrate supports for the apparatus of the invention special supports adapted to the sites upon which the display panel is to be raised are within the scope of the invention. The inventive concept permits installation of large display panels at sites heretofore precluded to conventional apparatus. Costs are lowered and artistic aspects enhanced by apparatus in accordance with the invention. In view of its versatility the scope of the invention is defined by the following claims rather than by the purely illustrative embodiments disclosed in the detailed specification.

I claim:
1. A display signboard comprising at least one support, a first bed plate affixed to each support, a first sill member removably secured to the first bed plate member, a horizontal tubular beam of circular cross-section, a web interposed between the tubular beam and said first sill member to hold said tubular beam in spaced relation above said sill member, lateral braces fixed to the edges of the web and extending substantially between the sill and the tubular beam, a plurality of second bed plates spacedly arranged relative to said tubular beam with interposed webs extending substantially between said second bed plate and said tubular beam, a lateral brace affixed to each bed plate and to the edges of the second web associated therewith, a plurality of vertical frame members each being provided with a second sill, each second sill being secured to a second bed plate, and horizontally disposed stringers carried by said frame members adapted to support said display.

2. A display signboard comprising upright spaced supports, spacedly arranged first bed plates affixed to each of said supports, first sill members removably secured to the first bed plate members, a horizontal tubular beam of circular cross-section, a web interposed between the tubular beam and said first sill members to hold said tubular beam in spaced relation above said sill members, lateral braces fixed to the edges of the web and extending substantially between the sill and the tubular beam, a plurality of second bed plates spacedly arranged relative to said tubular beam with interposed webs extending substantially between said second bed plates and said tubular beam, a lateral brace affixed to each bed plate and to the edges of the second web associated therewith, a plurality of vertical frame members each being provided with a second sill, each second sill being secured to a second bed plate, and horizontally disposed stringers carried by said frame members adapted to support said display.

References Cited in the file of this patent

UNITED STATES PATENTS

| | | |
|---|---|---|
| 1,944,498 | Crick | Jan. 23, 1934 |
| 1,966,537 | Binckley | July 17, 1934 |
| 2,029,908 | Bleecker | Feb. 4, 1936 |
| 2,409,076 | Steinberger | Oct. 8, 1946 |
| 2,760,553 | Lie | Aug. 28, 1956 |
| 2,791,851 | Richter | May 14, 1957 |
| 2,925,264 | Loehr | Feb. 16, 1960 |
| 2,940,198 | Ressel | June 14, 1960 |

FOREIGN PATENTS

| | | |
|---|---|---|
| 538,788 | Italy | Jan. 30, 1956 |
| 1,106,052 | France | July 13, 1955 |
| 1,204,813 | France | Aug. 10, 1959 |